US006935549B2

(12) United States Patent
Wolf

(10) Patent No.: US 6,935,549 B2
(45) Date of Patent: Aug. 30, 2005

(54) BRAZING FIXTURES AND METHODS FOR FABRICATING BRAZING FIXTURES USED FOR MAKING FEED-THROUGH ASSEMBLIES

(75) Inventor: William D. Wolf, St. Louis Park, MN (US)

(73) Assignee: Medtronic, Inc., Minneapolis, MN (US)

( * ) Notice: Subject to any disclaimer, the term of this patent is extended or adjusted under 35 U.S.C. 154(b) by 179 days.

(21) Appl. No.: 10/445,069

(22) Filed: May 23, 2003

(65) Prior Publication Data

US 2004/0232204 A1 Nov. 25, 2004

(51) Int. Cl.$^7$ ............................................. B23K 37/00
(52) U.S. Cl. ................................. 228/49.1; 228/49.5
(58) Field of Search ........................... 228/44.3, 44.7, 228/49.1, 49.5

(56) References Cited

U.S. PATENT DOCUMENTS

| | | | |
|---|---|---|---|
| 3,698,618 A | * 10/1972 | Helda | 228/3.1 |
| 4,352,951 A | 10/1982 | Kyle | |
| 4,421,947 A | 12/1983 | Kyle | |
| 4,456,786 A | 6/1984 | Kyle | |
| 4,514,207 A | 4/1985 | Kyle | |
| 4,516,820 A | 5/1985 | Kuzma | |
| 4,655,164 A | * 4/1987 | Nelson et al. | 118/503 |
| 4,700,935 A | * 10/1987 | Winslow et al. | 269/126 |
| 4,747,532 A | * 5/1988 | Sim | 228/49.5 |
| 4,782,763 A | * 11/1988 | Salloum | 108/55.3 |
| 4,787,550 A | * 11/1988 | Masuda et al. | 228/49.5 |
| 4,964,560 A | * 10/1990 | Wharff | 228/49.5 |
| 5,046,242 A | 9/1991 | Kuzma | |
| 5,263,632 A | * 11/1993 | Zadrick et al. | 228/49.1 |
| 5,294,241 A | 3/1994 | Taylor et al. | |
| 5,406,444 A | 4/1995 | Selfried et al. | |
| 5,531,003 A | 7/1996 | Seifried et al. | |
| 5,571,146 A | 11/1996 | Jones et al. | |
| 5,632,085 A | 5/1997 | Tegeder | |
| 5,798,654 A | * 8/1998 | Van Loan et al. | 324/761 |
| 5,817,984 A | 10/1998 | Taylor et al. | |
| 5,821,011 A | 10/1998 | Taylor et al. | |
| 5,844,198 A | 12/1998 | Jones et al. | |
| 5,866,851 A | 2/1999 | Taylor et al. | |
| 5,870,272 A | 2/1999 | Seifried et al. | |
| 5,871,513 A | 2/1999 | Taylor et al. | |
| 5,906,635 A | 5/1999 | Maniglia | |
| 6,008,980 A | 12/1999 | Stevenson et al. | |
| 6,165,232 A | * 12/2000 | Tieber et al. | 29/25.01 |
| 6,187,654 B1 | * 2/2001 | Tieber | 438/464 |
| 6,237,832 B1 | * 5/2001 | Chung | 228/44.7 |
| 6,442,818 B1 | * 9/2002 | Kay et al. | 29/281.1 |
| 6,453,551 B1 | * 9/2002 | Nordquist et al. | 29/862 |
| 6,752,391 B1 | * 6/2004 | Euker | 269/289 R |
| 2004/0231877 A1 | * 11/2004 | Wolf et al. | 174/50.61 |
| 2004/0232204 A1 | * 11/2004 | Wolf | 228/49.1 |

FOREIGN PATENT DOCUMENTS

JP          01026319 A    *  1/1989

* cited by examiner

Primary Examiner—Kiley S. Stoner
(74) Attorney, Agent, or Firm—Girma Wolde-Michael; Paul H. McDowall

(57) ABSTRACT

A brazing fixture for fabricating a feed-through assembly during a brazing process and a method for forming a brazing fixture are provided. The brazing fixture includes a holding tray and a nesting plate removably mounted on the holding tray. The nesting plate has a surface with at least one nest disposed at the surface. The nest has a first well disposed at the surface of the nesting plate, the first well having first walls. A second well is disposed adjacent to and in concentric relationship with the first well, the second well having second walls. An orifice is disposed adjacent to the second well, the orifice having third walls. A release coating overlies the first walls of the first well and is absent from the third walls of the orifice.

30 Claims, 4 Drawing Sheets

BRAZING FIXTURES AND METHODS FOR FABRICATING BRAZING FIXTURES USED FOR MAKING FEED-THROUGH ASSEMBLIES

CROSS REFERENCE TO RELATED APPLICATION

The present patent application relates to non-provisional U.S. patent application Ser. No. 10/444,448, now U.S. Pat. No. 6,852,925 filed on May 23, 2003 and entitled, "Feed-through Assemblies having Terminal Pin Comprising Platinum and Methods for Fabricating Same" the contents of which are incorporated herein.

FIELD OF THE INVENTION

The present invention generally relates to brazing fixtures, and more particularly relates to brazing fixtures and methods for fabricating brazing fixtures used to make feed-through assemblies such as those used in medical devices and electrochemical cells and the like.

BACKGROUND OF THE INVENTION

Electrical feed-through assemblies serve the purpose of providing an electrical circuit path extending from the interior of a hermetically sealed container to an external point outside the container. A conductive path is provided through the feed-through assembly by a conductive terminal pin that is electrically insulated from the container. Many such feed-through assemblies are known in the art that provide the electrical path and seal the electrical container from its ambient environment. Such feed-through assemblies typically include a ferrule, the terminal pin and an insulating member that supports the pin within the ferrule. Such feed-through assemblies often are used in an electrical implantable medical device (IMD) such as an implantable drug pump and an implantable pulse generator (IPG) including cardiac rhythm management devices, deep brain stimulators, nerve stimulators and the like. Herein all such devices, including electrochemical cells, are intended to be encompassed under the rubric of the abbreviated IMD. The reliability of an IMD depends, in large part, on the hermetic sealing of the various components of the feed-through assemblies. The hermetic sealing may be achieved by brazing the components of the feed-through assembly using a brazing metal or alloy.

Brazing of feed-through assemblies typically includes assembling the components of the feed-through assemblies on a brazing fixture and inserting the brazing fixture in a furnace that subjects the feed-through assembly components to high temperatures, usually in excess of 500° C. Because of the high temperatures at which brazing occurs, brazing of feed-through assemblies poses significant challenges. Depending on the material from which the brazing fixture and the ferrule is fabricated, the ferrule may bond to the brazing fixture during brazing, making the feed-through assemblies difficult to remove from the brazing fixture. Moreover, materials of the brazing fixture may chemically react with the terminal pin, thereby reducing the melting point of the terminal pin and causing the terminal pin to melt during brazing.

Accordingly, it is desirable to provide a brazing fixture for the fabrication of feed-through assemblies that reduces the likelihood that a feed-through assembly will bond to the brazing fixture during brazing. In addition, it is desirable to provide a brazing fixture that will not reduce the melting point of the terminal pin of the feed-through assembly during brazing. It is also desirable to provide a method for fabricating an improved brazing fixture. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

According to an exemplary embodiment of the invention, there is provided a nesting plate for fabricating a feed-through assembly during a brazing process. The nesting plate comprises a substrate plate that has a surface with at least one nest disposed at the surface. The nest has a first well disposed at the surface of the substrate plate, the first well having first walls. A second well is disposed adjacent to and in concentric relationship with the first well, the second well having second walls. An orifice is disposed adjacent to the second well, the orifice having third walls. A release coating overlies the first walls of the first well and is absent from the third walls of the orifice.

According to another exemplary embodiment of the invention, there is provided a brazing fixture for fabricating a feed-through assembly during a brazing process. The brazing fixture comprises a holding tray and a nesting plate removably mounted on the holding tray. The nesting plate has a surface and at least one nest disposed at the surface. The nest has a first well disposed at the surface of the nesting plate, the first well having first walls. A second well is disposed adjacent to and in concentric relationship with the first well, the second well having second walls. An orifice is disposed adjacent to the second well, the orifice having third walls. A release coating overlies the first walls of the first well. The release coating is absent from the third walls of the orifice.

According to a further exemplary embodiment of the invention, there is provided a method for fabricating a brazing fixture. The method begins with the step of providing a substrate plate having a surface. A first well is formed at the surface of the substrate plate, the first well having well walls. A release coating is deposited overlying the well walls of the first well. After the step of depositing, a second well is formed adjacent to and in concentric relationship with the first well and an orifice is formed proximate to and in concentric relationship with the first well.

According to yet another exemplary embodiment of the invention, there is provided a method for fabricating a brazing fixture. The method begins with the step of providing a substrate plate having a surface. A first well is formed at the surface of the substrate plate, the first well have first walls. A second well is formed adjacent to the first well, the second well having second walls. A release coating is deposited overlying the first and second walls. After the step of depositing, an orifice is formed adjacent to the second well.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
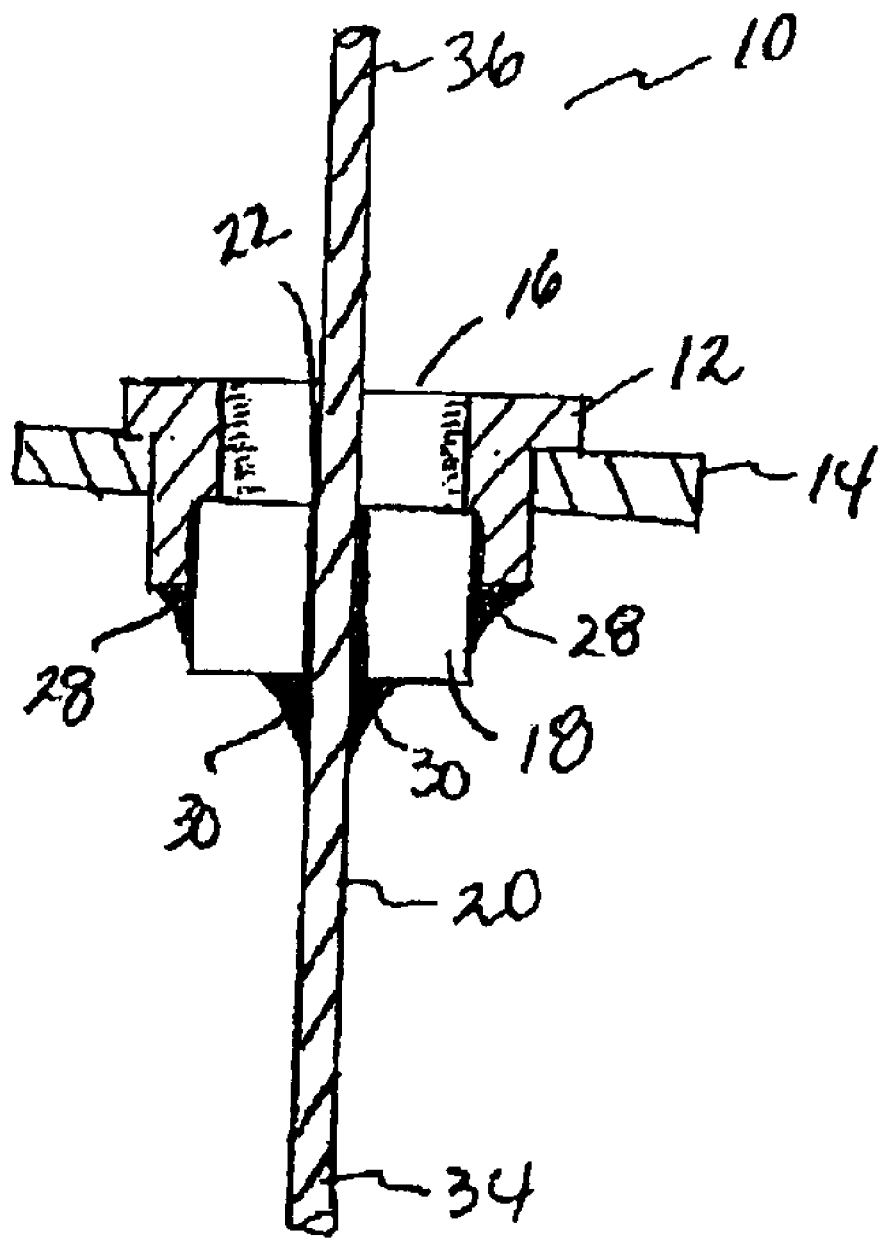
FIG. 1 is a cross-sectional view of a feed-through assembly that may be fabricated using the various embodiments of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention.

The various embodiments of the present invention include a brazing fixture for fabrication of feed-through assemblies. One example of a feed-through assembly that can be fabricated using a brazing fixture of the present invention is a feed-through assembly 10 illustrated in FIG. 1. One application for which feed-through assembly 10 has particular but not limited utility is in implantable medical devices. Feed-through assembly 10 comprises a ferrule 12, which is affixed to a shield or container 14 of an implantable medical device, such as an implantable pulse generator, a cochlear implant and the like. Ferrule 12 has a first aperture 16 disposed therethrough. Typically, ferrule 12 has an annular configuration but may have any configuration suitable for use with shield or container 14 of the implantable medical device. Ferrule 12 may be formed of titanium, niobium, platinum, molybdenum, tantalum, zirconium, vanadium, tungsten, iridium, rhodium, rhenium osmium, ruthenium, palladium, any combination thereof, or any other suitable metal or combination of metals. Ferrule 12 is affixed to shield or container 14 preferably by welding, although any other suitable means, such as gluing or soldering, may be used.

Feed-through assembly 10 further comprises an insulating member 18, which is disposed at least partially within first aperture 16 of ferrule 12. Insulating member 18 has a second aperture 22 disposed therethrough and which is in a concentric relationship with first aperture 16. Insulating member 18 may be formed of any suitable electrically insulative, ceramic-containing material, such as, for example, alumina or aluminum oxide, sapphire, ruby, or zinc oxide.

Additionally, feed-through assembly 10 comprises a terminal pin 20. Terminal pin 20 may extend through second aperture 22 of insulating member 18 and, accordingly, through first aperture 16 of ferrule 12 in a concentric relationship to insulating member 18 and ferrule 12. Terminal pin 20 is formed of an electrically conductive material, preferably comprising platinum and more preferably comprising substantially all platinum or a platinum-iridium composition. Insulating member 18 provides electrical insulation between ferrule 12 and terminal pin 20. In a typical installation, a first end 34 of terminal pin 20 may extend into the interior of the implantable medical device enclosed by shield or container 14 and make electrical contact with the contents thereof and a second end 36 may extend exteriorly of the implantable medical device. Alternatively, first end 34 may terminate within or at a surface 32 of insulator 18 and be electrically connected to the contents of the implantable medical device enclosed by shield or container 14.

In another embodiment, feed-through assembly 10 may comprise a plurality of terminal pins 20. Accordingly, insulating member 18 may comprise a like plurality of second apertures 22. Each of the plurality of terminal pins 20 may extend through one of the second apertures 22 within insulating member 18 and, accordingly, through first aperture 16 of ferrule 12. The plurality of terminal pins 20 and, accordingly, the plurality of second apertures 22, may be disposed within insulating member 18 in any suitable arrangement, such as, for example, a linear arrangement, a staggered array, multiple linear rows, one annular ring, concentric annular rings and the like. First ends 34 of the plurality of terminal pins 20 may extend into the interior of the implantable medical device enclosed by shield or container 14 and make electrical contact with the contents thereof and second ends 36 may extend exteriorly of the implantable medical device. Alternatively, some or all of first ends 34 of the plurality of terminal pins 20 may terminate within and/or at surface 32 of insulator 18 and be electrically connected to the contents of the implantable medical device enclosed by shield or container 14.

Feed-through assembly 10 further comprises a first brazing seal 28 that forms a hermetic seal between ferrule 12 and insulating member 18 and a second brazing seal 30 that forms a hermetic seal between insulating member 18 and terminal pin 20. Typically, brazing seals 28 and 30 are formed of gold, preferably 99.9% by weight gold or purer gold, although any suitable brazing material that hermetically seals feed-through assembly 10 may be used.

Figure 2:
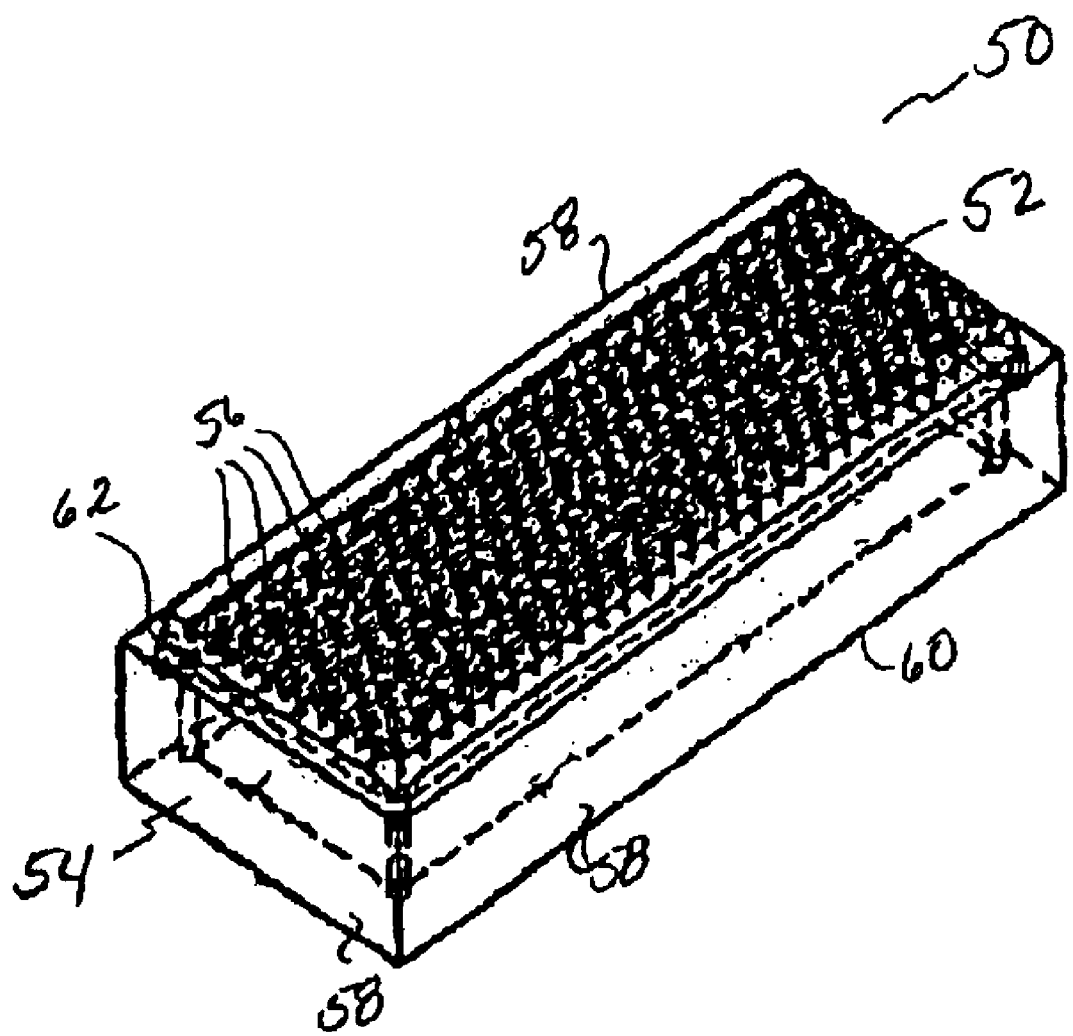
FIG. 2 is a perspective view of a brazing fixture for fabricating feed-through assemblies in accordance with an exemplary embodiment of the present invention.

Referring now to FIG. 2, in one exemplary embodiment of the present invention, a brazing fixture 50 for fabricating a feed-through assembly, such as feed-through assembly 10, is illustrated. Brazing fixture 50 comprises a nesting plate 52 and a holding tray 54 upon which nesting plate 52 is removably mounted. In one exemplary embodiment of the invention, holding tray 54 is hollow with a resting surface 60 and at least two opposing sidewalls 58 attached to or contiguous with resting surface 60. Each sidewall 58 is attached to or is contiguous with a lip 62 that is parallel to resting surface 60. Lips 62 are configured such that nesting plate 52 may rest thereupon so as to be removably mounted onto holding tray 54. Holding tray 54 is formed from a material or materials with a sufficiently high melting point so that the chemical and physical properties of holding tray 54 are not compromised when holding tray 54 is in use. In a preferred embodiment of the invention, holding tray 54 has a melting point above the temperature at which brazing fixture 50 is to be employed for the fabrication of feed-through assemblies. Examples of materials suitable for forming holding tray 54 include graphite, refractory metals such as molybdenum, tantalum, titanium, tungsten, niobium and the like, and ceramic materials such as alumina, boron nitride and the like. In a preferred embodiment of the invention, holding tray 54 is formed from graphite. Nesting plate 52 comprises at least one nest 56, preferably a plurality of nests 56, for fabrication of feed-through assemblies 10, as described in more detail hereinbelow.

Figure 3:
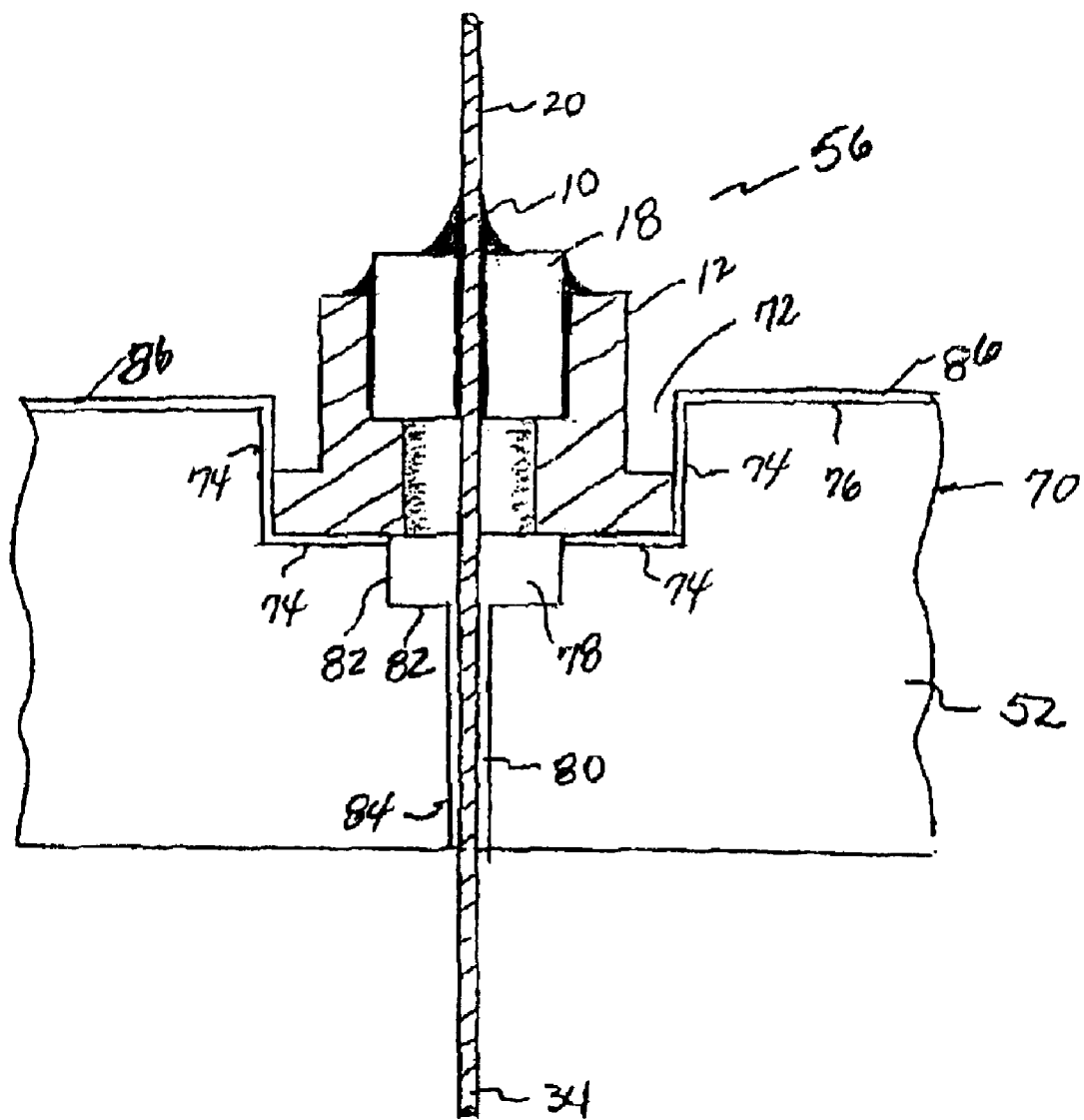
FIG. 3 is a cross-sectional view of components of a feed-through assembly seated in a nesting plate of a brazing fixture in accordance with an exemplary embodiment of the present invention.

Referring to FIG. 3, nesting plate 52 comprises a substrate plate 70 having a surface 76. Substrate plate 70 is formed from a material or materials with a sufficiently high melting point so that the chemical and physical properties of substrate plate 70 are not compromised when substrate plate 70 is in use. In a preferred embodiment of the invention, substrate plate 70 has a melting point above the temperature at which brazing fixture 50 is to be employed for the fabrication of feed-through assemblies. Substrate plate 70 is also formed of a material that does not react physically or chemically with terminal pin 20 during brazing. Examples of materials suitable for forming substrate plate 70 include graphite, refractory metals such as molybdenum, tantalum, titanium, tungsten, niobium and the like, and ceramic material such as alumina, boron nitride and the like. In a preferred embodiment of the invention, substrate plate 70 is formed from graphite.

FIG. 3 illustrates one nest 56 of nesting plate 52 in which a feed-through assembly 10 has been fabricated. Elements of FIG. 3 that have the same reference numbers as FIGS. 1 and 2 are the same as the corresponding FIGS. 1 and 2 elements. While nesting plate 52 is illustrated in FIG. 3 as having one nest 56, it will be understood that nesting plate 52 can have any suitable number of nests 56 within which to fabricate feed-through assemblies 10. Typically, nesting plate 52 has one hundred (100) to five hundred (500) nests 56. Nest 56 has a first well 72 disposed at surface 76 of substrate plate 70. First well 72 is configured to receive ferrule 12 of feed-through assembly 10. First well 72 has first walls 74 upon which overlies a release coating 86. Release coating 86 comprises a suitable release material that reduces the likelihood that ferrule 12 will bond to substrate plate 70 during brazing and that permits ferrule 12 to be easily removed from substrate plate 70 after the brazing process. In addition, release coating 86 comprises a material or materials with a sufficiently high melting point so that the chemical and physical properties of release coating 86 are not compromised when brazing fixture 50 is in use. In a preferred embodiment of the invention, release coating 86 has a melting point above the temperature at which brazing fixture 50 is to be employed for the fabrication of feed-through assemblies. Suitable materials for release coating 86 include carbide compounds, such as silicon carbide, titanium carbide, and the like and other materials such as aluminum nitride, pyrolytic graphite and pyrolytic boron nitride. In a preferred embodiment of the invention, release coating 86 comprises silicon carbide.

Nest 56 also has a second well 78 that is adjacent to and in concentric relationship with first well 72. Second well 78 has second walls 82. In one embodiment of the present invention, release coating 86 overlies second walls 82 of second well 78. In an alternative embodiment of the present invention, release coating 86 is absent from second walls 82. Nest 56 also has at least one orifice 80, depending on the number of terminal pins 20 that will comprise feed-through assembly 10. In one embodiment of the invention, where feed-through assembly 10 will comprise one terminal pin 20, nest 56 comprises one orifice 80 that is proximate to and in concentric relationship with first well 72 and adjacent to and in concentric relationship with second well 78. Orifice 80 is configured to receive terminal pin 20 upon the threading of terminal pin 20 through insulating member 18 during fabrication of feed-through assembly 10, as discussed in more detail below. In another embodiment of the present invention, where feed-through assembly 10 will comprise an "X" number of terminal pins 20, nest 56 comprises at least an "X" number of orifices suitably arranged so as to be configured to receive terminal pins 20 upon the threading of terminal pins 20 through insulating member 18 during fabrication of feed-through assembly 10, as discussed in more detail below.

In one exemplary embodiment of the present invention, when brazing fixture 50 is in use, a ferrule 12 is disposed within first well 72 of nest 56 of nesting plate 52. As described above, nesting plate 52 is configured so that ferrule 12 is seated, at least partially, upon release coating 86. An insulating member 18 may be suitably disposed within aperture 16 of ferrule 12. A first brazing preform used to form brazing seal 30 is threaded onto a terminal pin 20. Terminal pin 20 may be threaded through second aperture 22 of insulating member 18 and through first aperture 16 of ferrule 12. The first brazing preform is seated adjacent insulating member 18. If the feed-through assembly 10 is to comprise a plurality of terminal pins 20, a first brazing preform is threaded onto each of the plurality of terminal pins and each of the terminal pins is disposed within a suitable second aperture 22 of insulating member 18. End 34 of terminal pin 20 may rest upon resting surface 60 of brazing fixture 50 to maintain the position of terminal pin 20 relative to ferrule 12 and insulating member 18. A second brazing preform used to form brazing seal 28 is disposed around the outside of insulating member 18 and is seated adjacent to ferrule 12. Brazing fixture 50 then is inserted into a brazing furnace and brazing commences. During brazing, the preforms employed to form brazing seals 28 and 30 are heated to a suitable temperature, at or above the melting point of the preforms, where the feed-through assembly is maintained for a suitable time period. Upon heating to their melting points, the preforms become liquid that flows between ferrule 12 and insulating member 18 forming brazing seal 28 and between insulating member 18 and terminal pin 20 forming brazing seal 30.

As described above, ferrule 12 is seated, at least partially, upon release coating 86. During brazing, release coating 86 reduces the likelihood that ferrule 12 will bond with brazing fixture 50 and, after brazing, feed-through assembly 10 may be conveniently removed from brazing fixture 50. Further, as described above, release coating 86 is absent from third walls 84. Thus, terminal pin 20 does not come in contact with, or comes in limited contact with, release coating 86, which otherwise may react with terminal pin 20 during brazing and may reduce the melting point of terminal pin 20. Accordingly, during brazing the physical and chemical integrity of terminal pin 20 is maintained.

Figure 4:
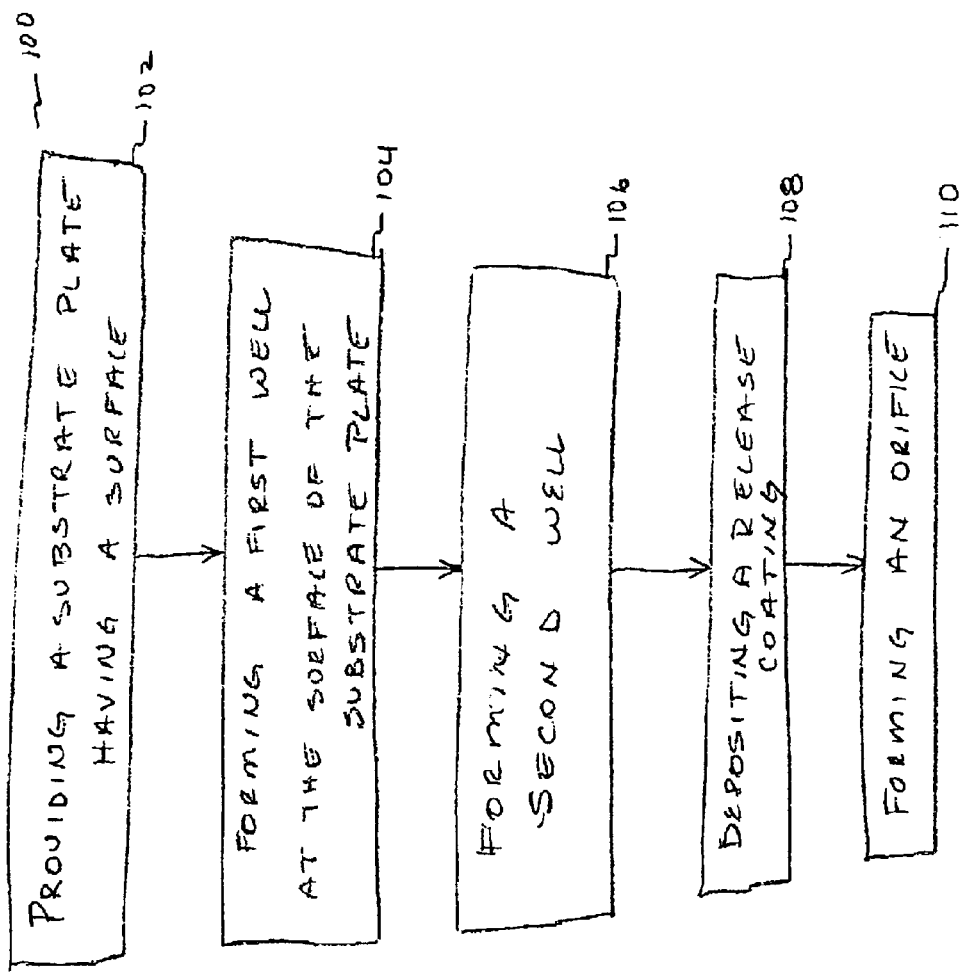
FIG. 4 is a flowchart of a method for fabricating a brazing fixture in accordance with an exemplary embodiment of the present invention.

FIG. 4 illustrates a method 100 for fabricating a brazing fixture 50 in accordance with an exemplary embodiment of the present invention. Referring to FIGS. 2–4, method 100 begins by providing a substrate plate 70 having a surface 76, step 102. A first well 72 is formed in substrate plate 70 at surface 76 using any suitable method, such as by drilling first well 72 into surface 76 of substrate plate 70, step 104. After the formation of first well 72, a second well 78 may be formed adjacent to and in concentric relationship with first well 72, step 106. Second well 78 may be formed using any suitable method, such as by drilling second well 78 into substrate plate 70. A release coating 86 then may be formed overlying first walls 74 of first well 72 and second walls 82 of second well 78, step 108. In one exemplary embodiment, release coating 86 also may be formed overlying surface 76 of substrate plate 70. Release coating 86 may be formed overlying first walls 74, second walls 82, and surface 76, using any suitable method, such as for example, chemical vapor deposition.

In one exemplary embodiment of the invention, a silicon carbide release coating may be formed overlying first walls 74 and second walls 82, and, if desired, surface 76, of a graphite substrate plate 70 using a conversion process in which gaseous silicon monoxide (SiO) reacts with the top molecular layers of the graphite material of substrate plate 70 to form silicon carbide (SiC) with an excess of carbon monoxide (CO). The first step of the conversion creates SiO through the following reaction:

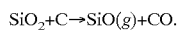

The SiO then partially infiltrates the substrate plate 70 at first walls 74 and second walls 82, converting the graphite to silicon carbide according to the following reaction:

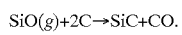

If surface 76 has not been covered by a suitable mask, silicon monoxide also may partially infiltrate the substrate plate 70 at surface 76. The depth of penetration of the SiO, and hence the depth of conversion of the graphite to silicon carbide, may depend on the length of time substrate plate 70 is exposed to silicon monoxide and may also depend on the temperature at which the conversion reaction occurs.

After deposition of release coating 86, orifice 80 then may be formed adjacent to and in concentric relationship with second well 78 using any suitable method, such as by drilling orifice 80 into substrate plate 70, step 110. If brazing fixture 50 is to comprise more than one orifice, then a plurality of orifices 80 may be formed adjacent to second well 78 in any suitable pattern.

In another exemplary embodiment of the present invention, after the formation of first well 72, release coating 86 may be formed overlying first walls 74 of first well 72. Release coating 86 also may be formed overlying surface 76 of substrate plate 70. Release coating 86 may be formed using any of the materials and any of the methods described above. After deposition of release coating 86, second well 78 may be formed adjacent to and in concentric relationship with first well 72. Second well 78 may be formed using any suitable method, such as by drilling second well 78 into substrate plate 70. Orifice 80 then may be formed adjacent to and in concentric relationship with second well 78 using any suitable method, such as by drilling orifice 80 into substrate plate 70. Again, if brazing fixture 50 is to comprise more than one orifice, then a plurality of orifices 80 may be formed adjacent to second well 78 in any suitable pattern. In an alternative embodiment of the present invention, orifice(s) 80 may be formed adjacent to first well 72 after the deposition of release coating 86 and second well 78 may be formed adjacent to and in concentric relationship with first well 72 and adjacent to orifice(s) 80 after the formation of orifice(s) 80. After second well 78 and orifice(s) 80 have been formed, nesting plate 52 may be mounted on holding tray 54 to form brazing fixture 50.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A nesting plate for fabricating a feed-through assembly during a brazing process, the nesting plate comprising:
   a substrate plate having a surface and at least one nest disposed at said surface, wherein said at least one nest having a first well disposed at said surface of said substrate plate, wherein said first well having first walls, a second well disposed adjacent to and in concentric relationship with said first well, wherein said second well having second walls, and an orifice disposed adjacent to said second well, wherein said orifice having third walls; and
   a release coating overlying said first walls of said first well, wherein said release coating absent from said third walls of said orifice.

2. A nesting plate according to claim 1, wherein said substrate plate comprised of a material with a melting point above a temperature at which the nesting plate is employed to fabricate a feed-through assembly.

3. A nesting plate according to claim 2, wherein said substrate plate comprises a material selected from the group comprising graphite, molybdenum, titanium, tantalum, tungsten, niobium and ceramic materials.

4. A nesting plate according to claim 1, wherein said release coating comprises a material with a melting point above a temperature at which the nesting plate is employed to fabricate a feed-through assembly.

5. A nesting plate according to claim 1, wherein said release coating comprises a material selected from the group comprising silicon carbide, titanium carbide, aluminum nitride, pyrolytic graphite and pyrolytic boron nitride.

6. A nesting plate according to claim 1, wherein said release coating overlies said second walls of said second well.

7. A nesting plate according to claim 1, wherein said substrate plate has a plurality of orifices.

8. A brazing fixture for fabricating a feed-through assembly during a brazing process, the brazing fixture comprising:
   a holding tray;
   a nesting plate removably mounted on said holding tray, wherein said nesting plate having a surface and at least one nest disposed at said surface, wherein said at least one nest having a first well disposed at said surface of said nesting plate, wherein said first well having first walls, a second well disposed adjacent to and in concentric relationship with said first well, wherein said second well having second walls, and an orifice disposed adjacent to said second well, wherein said orifice having third walls; and
   a release coating overlying said first walls of said first well, wherein said release coating absent from said third walls of said orifice.

9. A brazing fixture according to claim 8, wherein said nesting plate comprises a material with a melting point above a temperature at which the brazing fixture is employed to fabricate the feed-through assembly.

10. A brazing fixture according to claim 9, wherein said nesting plate comprises a material selected from the group comprising graphite, molybdenum, titanium, tantalum, tungsten, niobium, and ceramic materials.

11. A brazing fixture according to claim 8, wherein said release coating comprises a material with a melting point above a temperature at which the brazing fixture is employed to fabricate the feed-through assembly.

12. A brazing fixture according to claim 11, wherein said release coating comprises at least a one of the group comprising silicon carbide, titanium carbide, aluminum nitride, pyrolytic graphite and pyrolytic boron nitride.

13. A brazing fixture according to claim 8, wherein said holding tray comprises a material with a melting point above a temperature at which the brazing fixture is employed to fabricate the feed-through assembly.

14. A brazing fixture according to claim 13, wherein said holding tray comprises a material selected from the group comprising graphite, molybdenum, titanium, tantalum, tungsten, niobium and ceramic materials.

15. A brazing fixture according to claim 8, wherein said release coating overlies said second walls of said second well.

16. A brazing fixture according to claim 8, wherein said nesting plate comprises a plurality of orifices.

17. A brazing fixture according to claim 8, wherein said holding tray comprising:
a resting surface;
at least two opposing sidewalls connected to said resting surface; and
a lip connected to each of said at least two opposing sidewalls, wherein said lip disposed parallel to said resting surface and configured to receive said nesting plate thereon.

18. A method for fabricating a brazing fixture, the method further comprising:
providing a substrate plate having a surface;
forming a first well at said surface of said substrate plate, wherein said first well having well walls;
depositing a release coating overlying said well walls of said first well;
after said step of depositing, forming a second well adjacent to and in concentric relationship with said first well; and
after said step of depositing, forming an orifice proximate to and in concentric relationship with said first well.

19. A method according to claim 18, wherein said step of forming said orifice is performed before said step of forming said second well.

20. A method according to claim 18, wherein said step of providing a substrate plate comprising providing a substrate plate comprising a material selected from the group: graphite, molybdenum, titanium, tantalum, tungsten, niobium and ceramic materials.

21. A method according to claim 18, wherein said step of depositing a release coating comprises depositing a release coating from the group comprising: silicon carbide, titanium carbide, aluminum nitride, pyrolytic graphite and pyrolytic boron nitride.

22. A method according to claim 18, further comprising the step of removably mounting said substrate plate onto a holding tray.

23. A method according to claim 22, wherein said step of removably mounting comprises removably mounting said substrate plate onto a holding tray comprising a material selected from the group: graphite, molybdenum, titanium, tantalum, tungsten, niobium, and ceramic materials.

24. A method according to claim 18, wherein said step of forming an orifice comprises forming a plurality of orifices.

25. A method for fabricating a brazing fixture, further comprising:
providing a substrate plate having a surface;
forming a first well at said surface of said substrate plate, wherein said first well having first walls;
forming a second well adjacent to said first well, wherein said second well having second walls;
depositing a release coating overlying said first and second walls; and
after said step of depositing, forming an orifice adjacent to said second well.

26. A method according to claim 25, wherein said step of providing a substrate plate comprises providing a substrate plate formed of a material selected from the group comprising graphite, molybdenum, titanium, tantalum, tungsten, niobium and ceramic materials.

27. A method according to claim 25, wherein the step of depositing a release coating comprises depositing one selected from the group comprising silicon carbide, titanium carbide, aluminum nitride, pyrolytic graphite and pyrolytic boron nitride.

28. A method according to claim 25, further comprising the step of removably mounting said substrate plate onto a holding tray.

29. A method according to claim 28, wherein said step of removably mounting comprises removably mounting said substrate plate onto a holding tray comprising a material selected from the group: graphite, molybdenum, titanium, tantalum, tungsten, niobium, and ceramic materials.

30. A method according to claim 25, wherein said step of forming an orifice comprises forming a plurality of orifices.

* * * * *